(12) United States Patent
Mori et al.

(10) Patent No.: US 10,855,198 B2
(45) Date of Patent: Dec. 1, 2020

(54) POWER SUPPLY APPARATUS INCLUDING AC-DC CONVERTERS CONNECTED IN PARALLEL AND DRIVEN BASED ON LOAD CURRENT

(71) Applicant: Murata Manufacturing Co., Ltd., Nagaokakyo (JP)

(72) Inventors: Michiya Mori, Nagaokakyo (JP); Gaku Kamitani, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/293,727

(22) Filed: Mar. 6, 2019

(65) Prior Publication Data
US 2019/0199233 A1 Jun. 27, 2019

Related U.S. Application Data (63) Continuation of application No. PCT/JP2017/031102, filed on Aug. 30, 2017.

(30) Foreign Application Priority Data

Sep. 12, 2016 (JP) .................. 2016-177247

(51) Int. Cl.
*H02M 7/12* (2006.01)
*G06F 1/26* (2006.01)
(Continued)

(52) U.S. Cl.
CPC ................ *H02M 7/12* (2013.01); *G06F 1/26* (2013.01); *H02J 3/26* (2013.01); *H02M 7/08* (2013.01);
(Continued)

(58) Field of Classification Search
CPC .... H02J 1/10; H02J 1/12; H02J 1/102; H02M 2001/008; H02M 7/02; H02M 7/04;
(Continued)

(56) References Cited

U.S. PATENT DOCUMENTS 6,175,512 B1 * 1/2001 Hagihara ............... H02M 7/493
323/906
2010/0013307 A1 * 1/2010 Heineman ................. G06F 1/26
307/33
(Continued)

FOREIGN PATENT DOCUMENTS

JP 9-149642 A 6/1997
JP 2002-330588 A 11/2002
(Continued)

OTHER PUBLICATIONS

Official Communication issued in International Patent Application No. PCT/JP2017/031102, dated Oct. 10, 2017.

*Primary Examiner* — Gustavo A Rosario-Benitez
(74) *Attorney, Agent, or Firm* — Keating & Bennett, LLP (57) ABSTRACT

A power supply apparatus includes converters connected in parallel to a three-phase alternating-current power supply, input current detectors that detect current flowing through the respective three phases of the three-phase alternating-current power supply, and load current detectors that detect load current of the converters. Each of the converters includes AC-DC converters inputs of connected to two of the three phases. The AC-DC converters are connected in parallel to each other using a common output. The AC-DC converters that are driven maintain balance of output current. A controller determines whether switching between a driven state and a stopped state of the respective AC-DC converters is performed based on detection results from the load current detectors and switches between the driven state
(Continued)

and the stopped state of the respective multiple AC-DC converters based on detection results by the input current detectors.

10 Claims, 6 Drawing Sheets

(51) Int. Cl.
    *H02J 3/26*     (2006.01)
    *H02M 7/23*     (2006.01)
    *H02M 7/08*     (2006.01)
    *H02M 7/217*     (2006.01)
    *H02M 1/00*     (2006.01)

(52) U.S. Cl.
    CPC ............ *H02M 7/23* (2013.01); *H02M 7/2173* (2013.01); *H02M 2001/007* (2013.01); *H02M 2001/0048* (2013.01); *H02M 2001/0054* (2013.01)

(58) Field of Classification Search
    CPC ............ H02M 7/12; H02M 7/17; H02M 7/21; H02M 7/217; H02M 7/219; H02M 7/23; H02M 7/81; H02M 3/1584; H02M 2001/007; H02M 2001/0077; H02M 3/285
    See application file for complete search history.

(56) References Cited

U.S. PATENT DOCUMENTS

| | | | | |
|---|---|---|---|---|
| 2013/0207562 A1* | 8/2013 | Zhang | ................... | H05B 45/46 |
| | | | | 315/201 |
| 2014/0268947 A1* | 9/2014 | Phadke | ................... | H02J 1/102 |
| | | | | 363/69 |
| 2015/0124505 A1* | 5/2015 | Wang | ................... | H02M 7/219 |
| | | | | 363/126 |
| 2015/0145462 A1* | 5/2015 | Ulrich | ................... | H02M 5/458 |
| | | | | 318/503 |
| 2015/0333629 A1* | 11/2015 | Jang | ................... | H02M 3/1584 |
| | | | | 323/271 |
| 2016/0282892 A1* | 9/2016 | Saavedra | ................... | G05F 1/66 |

FOREIGN PATENT DOCUMENTS

| | | |
|---|---|---|
| JP | 2005-223978 A | 8/2005 |
| JP | 2006-340435 A | 12/2006 |
| JP | 2006-353048 A | 12/2006 |
| JP | 2011-250594 A | 12/2011 |
| JP | 2014-82837 A | 5/2014 |

\* cited by examiner

| | RACK 1 [kW] | RACK 2 [kW] | RACK 3 [kW] | INTERPHASE POWER [kW] |
|---|---|---|---|---|
| R-S | 1.0 [DRIVEN 1· STOPPED 1] | 0 [DRIVEN 0· STOPPED 2] | 1.5 [DRIVEN 1· STOPPED 1] | 2.5 |
| S-T | 1.0 [DRIVEN 1· STOPPED 1] | 1.5 [DRIVEN 1· STOPPED 1] | 1.5 [DRIVEN 1· STOPPED 1] | 4.0 |
| T-R | 1.0 [DRIVEN 1· STOPPED 1] | 1.5 [DRIVEN 1· STOPPED 1] | 3.0 [DRIVEN 2· STOPPED 0] | 5.5 |
| SUM OF POWER IN RACK | 3.0 | 3.0 | 6.0 | |

| | RACK 1 [kW] | RACK 2 [kW] | RACK 3 [kW] | INTERPHASE POWER [kW] |
|---|---|---|---|---|
| R-S | 1.5 [DRIVEN 1· STOPPED 1] | 0 [DRIVEN 0· STOPPED 2] | 1.5 [DRIVEN 1· STOPPED 1] | 3.0 |
| S-T | 1.5 [DRIVEN 1· STOPPED 1] | 1.5 [DRIVEN 1· STOPPED 1] | 1.5 [DRIVEN 1· STOPPED 1] | 4.5 |
| T-R | 0 [DRIVEN 0· STOPPED 2] | 1.5 [DRIVEN 1· STOPPED 1] | 3.0 [DRIVEN 2· STOPPED 0] | 4.5 |
| SUM OF POWER IN RACK | 3.0 | 3.0 | 6.0 | |

FIG. 6

| | RACK 1 [kW] | RACK 2 [kW] | RACK 3 [kW] | INTERPHASE POWER [kW] |
|---|---|---|---|---|
| R-S | 2.0 [DRIVEN 1· STOPPED 1] | 0 [DRIVEN 0· STOPPED 2] | 1.5 [DRIVEN 1· STOPPED 1] | 3.5 |
| S-T | 2.0 [DRIVEN 1· STOPPED 1] | 1.5 [DRIVEN 1· STOPPED 1] | 1.5 [DRIVEN 1· STOPPED 1] | 5.0 |
| T-R | 2.0 [DRIVEN 1· STOPPED 1] | 0 [DRIVEN 0· STOPPED 2] | 3.0 [DRIVEN 2· STOPPED 0] | 5.0 |
| SUM OF POWER IN RACK | 6.0 | 1.5 | 6.0 | |

| | RACK 1 [kW] | RACK 2 [kW] | RACK 3 [kW] | INTERPHASE POWER [kW] |
|---|---|---|---|---|
| R-S | 3.0 [DRIVEN 2· STOPPED 0] | 0 [DRIVEN 0· STOPPED 2] | 1.5 [DRIVEN 1· STOPPED 1] | 4.5 |
| S-T | 1.5 [DRIVEN 1· STOPPED 1] | 1.5 [DRIVEN 1· STOPPED 1] | 1.5 [DRIVEN 1· STOPPED 1] | 4.5 |
| T-R | 1.5 [DRIVEN 1· STOPPED 1] | 0 [DRIVEN 0· STOPPED 2] | 3.0 [DRIVEN 2· STOPPED 0] | 4.5 |
| SUM OF POWER IN RACK | 6.0 | 1.5 | 6.0 | |

POWER SUPPLY APPARATUS INCLUDING AC-DC CONVERTERS CONNECTED IN PARALLEL AND DRIVEN BASED ON LOAD CURRENT

CROSS REFERENCE TO RELATED APPLICATIONS

This application claims the benefit of priority to Japanese Patent Application No. 2016-177247 filed on Sep. 12, 2016 and is a Continuation Application of PCT Application No. PCT/JP2017/031102 filed on Aug. 30, 2017. The entire contents of each of these applications are hereby incorporated herein by reference.

BACKGROUND OF THE INVENTION

1. Field of the Invention

The present invention relates to a power supply apparatus that supplies electric power from a three-phase alternating-current power supply to a load.

2. Description of the Related Art

Japanese Unexamined Patent Application Publication No. 9-149642 discloses a switching power supply that improves the power factor of three-phase input. The switching power supply described in Japanese Unexamined Patent Application Publication No. 9-149642 has a configuration in which converters that use the respective two phases in the three-phase input as a single-phase input are connected in parallel to an output unit. The voltage of each phase of the three-phase input power supply and the current of each phase thereof are supplied at the same phase to improve the power factor.

However, since each converter is constantly driven to constantly balance the phase current in Japanese Unexamined Patent Application Publication No. 9-149642, the converters consume a large amount of electric power and heat generation from the converters may be increased. Accordingly, although any of the multiple converters may be stopped depending on the condition (for example, during light load), the current balance between the respective phases may be lost in this case and the operation of the switching power supply may become unstable.

SUMMARY OF THE INVENTION

Preferred embodiments of the present invention provide power supply apparatuses that each reduce or prevent current unbalance of three-phase alternating-current input.

A power supply apparatus according to a preferred embodiment of the present invention includes multiple converters that are connected in parallel to a three-phase alternating-current power supply and that convert alternating-current power from the three-phase alternating-current power supply into direct-current power to supply the direct-current power to different loads, a phase current detector that detects current flowing through a first phase line, a second phase line, and a third phase line of the three-phase alternating-current power supply, and a load current detector that detects load current of the multiple converters. Each of the multiple converters includes a first AC-DC converter an input of which is connected to the first phase line and the second phase line, a second AC-DC converter an input of which is connected to the first phase line and the third phase line, and a third AC-DC converter an input of which is connected to the second phase line and the third phase line. The first AC-DC converter, the second AC-DC converter, and the third AC-DC converter are connected in parallel to each other using a common output. Each AC-DC converter that is driven maintains balance of output current. The power supply apparatus further includes a determiner that determines whether switching between a driven state and a stopped state of the first AC-DC converter, the second AC-DC converter, and the third AC-DC converter is performed based on a detection result from the load current detector, a selector that, if the determiner determines that the switching is performed, selects targets to be driven and to be stopped from the first AC-DC converter, the second AC-DC converter, and the third AC-DC converter based on a detection result by the phase current detector, and a controller that switches between the driven state and the stopped state of the first AC-DC converter, the second AC-DC converter, and the third AC-DC converter based on a selection result by the selector.

With the above configuration, selecting the AC-DC converter to be switched based on the detection result provided by the phase current detector in the switching between driving and stopping of the AC-DC converter enables current unbalance between the three phases to be reduced or prevented.

The phase current detector may directly detect the current of each phase. Alternatively, the phase current detector may perform calculation based on input current information about each AC-DC converter. Alternatively, the phase current detector may perform calculation based on load power information and input voltage information about each AC-DC converter. The load current detector may directly detect the load current. Alternatively, the load current detector may perform calculations based on load current information about each AC-DC converter. Alternatively, the load current detector may perform calculations based on input power information and load voltage information about each AC-DC converter.

If the determiner determines that the AC-DC converter in the driven state is to be switched to the stopped state, the selector may select the AC-DC converter connected to two phases having a largest difference in the current value, which is detected by the phase current detector, as the target to be stopped.

With the above configuration, since the AC-DC converter connected to the two phases having the largest difference in the current value, which is detected by the phase current detector, is stopped, the difference in current between the two phases is decreased to be close to the differences in current between other combinations of two phases. As a result, it is possible to reduce or prevent the current unbalance between the three phases.

If the determiner determines that the AC-DC converter in the stopped state is to be switched to the driven state, the selector may select the AC-DC converter connected to two phases having a smallest difference in the current value, which is detected by the phase current detector, as the target to be driven.

With the above configuration, since the AC-DC converter connected to the two phases having the smallest difference in the current value, which is detected by the phase current detector, is driven, the difference in current between the two phases is increased to be close to the differences in current between other combinations of two phases. As a result, it is possible to reduce or prevent the current unbalance between the three phases.

The determiner may perform the switching determination based on whether any two phases, among the three phases of the three-phase alternating-current power supply, have a difference in the current value exceeding a threshold value.

With the above configuration, it is possible to reduce or prevent the current unbalance between the three phases.

The determiner may determine that the AC-DC converter in the driven state is switched to the stopped state if a load factor of at least one of the first AC-DC converter, the second AC-DC converter, and the third AC-DC converter, which is detected from the detection result by the load current detector, is lower than a first predetermined value, and may determine that the AC-DC converter in the stopped state is switched to the driven state if the load factor exceeds a second predetermined value.

With the above configuration, stopping the AC-DC converter at a low load factor enables the loss in the AC-DC converter to be reduced so as to improve the power conversion efficiency. In addition, driving the AC-DC converter during heavy load enables the load factor of each AC-DC converter that is being driven to be decreased to cause the AC-DC converter to operate in a high efficiency area.

The selector may select the targets so that a minimum number of the AC-DC converters are to be switched.

With the above configuration, it is possible to reduce or prevent the current unbalance between the three phases while reducing or minimizing the effect on the process that is being performed.

The selector may select the AC-DC converter having a longest cumulative operating time.

With the above configuration, stopping the AC-DC converters having the longest cumulative operating time enables the failure rate of the AC-DC converters to be reduced.

According to preferred embodiments of the present invention, selecting the AC-DC converter to be switched based on the detection result by the phase current detector in the switching between driving and stopping of the AC-DC converter enables the current unbalance between the three phases to be reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the accompanying drawings.

Figure 1:
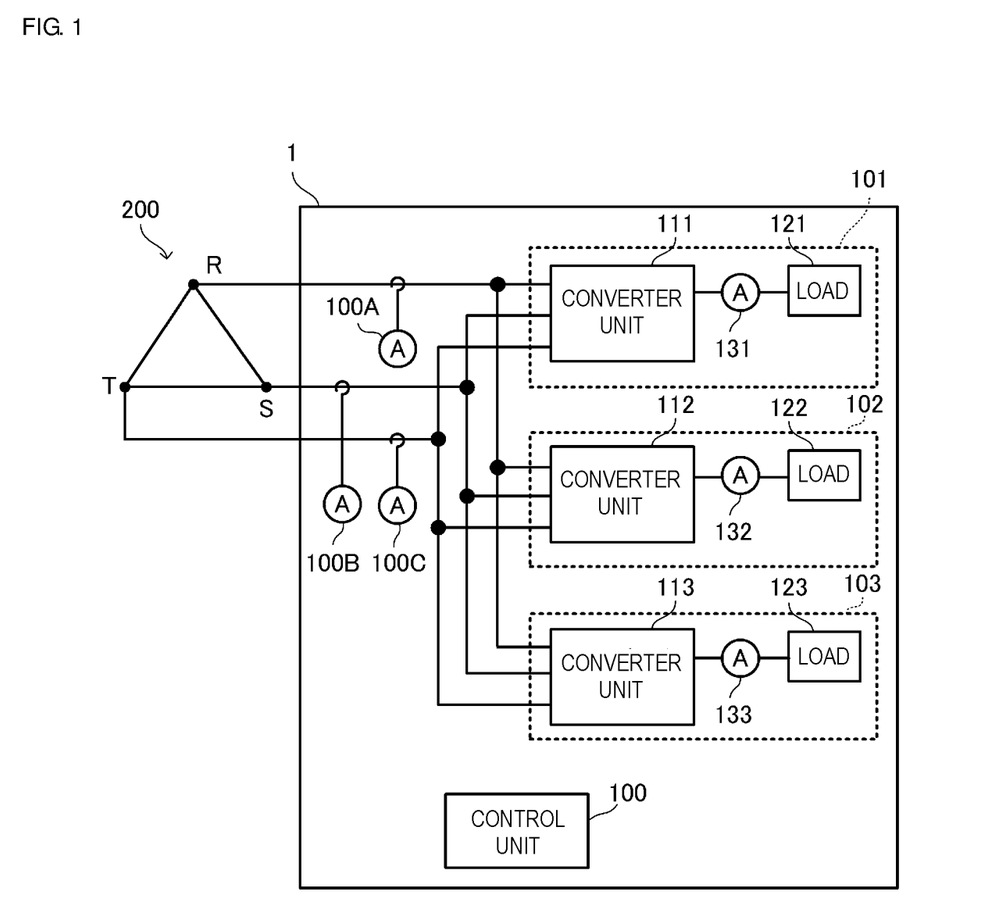
FIG. 1 is a block diagram of a power supply apparatus according to a preferred embodiment of the present invention.

FIG. 1 is a block diagram of a power supply apparatus 1 according to a preferred embodiment of the present invention.

The power supply apparatus 1 is described as a power supply apparatus for servers, for example. The respective phases (an R phase, an S phase, and a T phase) of a three-phase alternating-current power supply 200 are connected to the power supply apparatus 1. Although the three-phase alternating-current power supply 200 is represented by Δ connection in FIG. 1, the three-phase alternating-current power supply 200 may be represented by Y connection.

The power supply apparatus 1 includes a controller 100, multiple server racks 101, 102, and 103, and input current detectors 100A, 100B, and 100C. The input current detectors 100A, 100B, and 100C include current transformers provided for the respective phases (the R phase, the S phase, and the T phase) of the three-phase alternating-current power supply 200 and detect current flowing through the respective phases.

The input current detectors 100A, 100B, and 100C are examples of the "phase current detector" in preferred embodiments of the present invention. An R-phase line is an example of a "first phase line". An S-phase line is an example of a "second phase line". A T-phase line is an example of a "third phase line".

The server racks 101, 102, and 103 are connected in parallel to the three-phase alternating-current power supply 200. The server racks 101, 102, and 103 include converters 111, 112, and 113, loads 121, 122, and 123, and load current detectors 131, 132, and 133, respectively. Since the server racks 101, 102, and 103 preferably have the same or substantially the same configuration, the server rack 101 is exemplified in the following description.

The converter 111 includes multiple alternating current-direct current (AC-DC) converters connected in parallel to each other, which are described below. The converter 111 converts alternating-current voltage (for example, about 200 V) that is input into direct-current voltage (for example, about 12 V) and supplies the direct-current voltage to the load 121.

The load 121 preferably includes, for example, multiple blade servers housed in a casing. The converter 111 is connected to the load 121. Direct-current power is supplied from the converter 111 to the load 121.

The load current detector 131 preferably includes, for example, a current detection resistor and detects current (load current) supplied from the converter 111 to the load 121.

The controller 100 includes a microcomputer and other suitable components. The controller 100 acquires the detection results from the input current detectors 100A, 100B, and 100C and the detection results from the load current detectors 131, 132, and 133. Then, the controller 100 appropriately performs control, such as stopping the operations of the multiple AC-DC converters in the respective converters 111, 112, and 113 and start-up of the AC-DC converters that are stopped, from the detection results. A specific non-limiting example of a process performed by the controller 100 will be described below.

Figure 2:
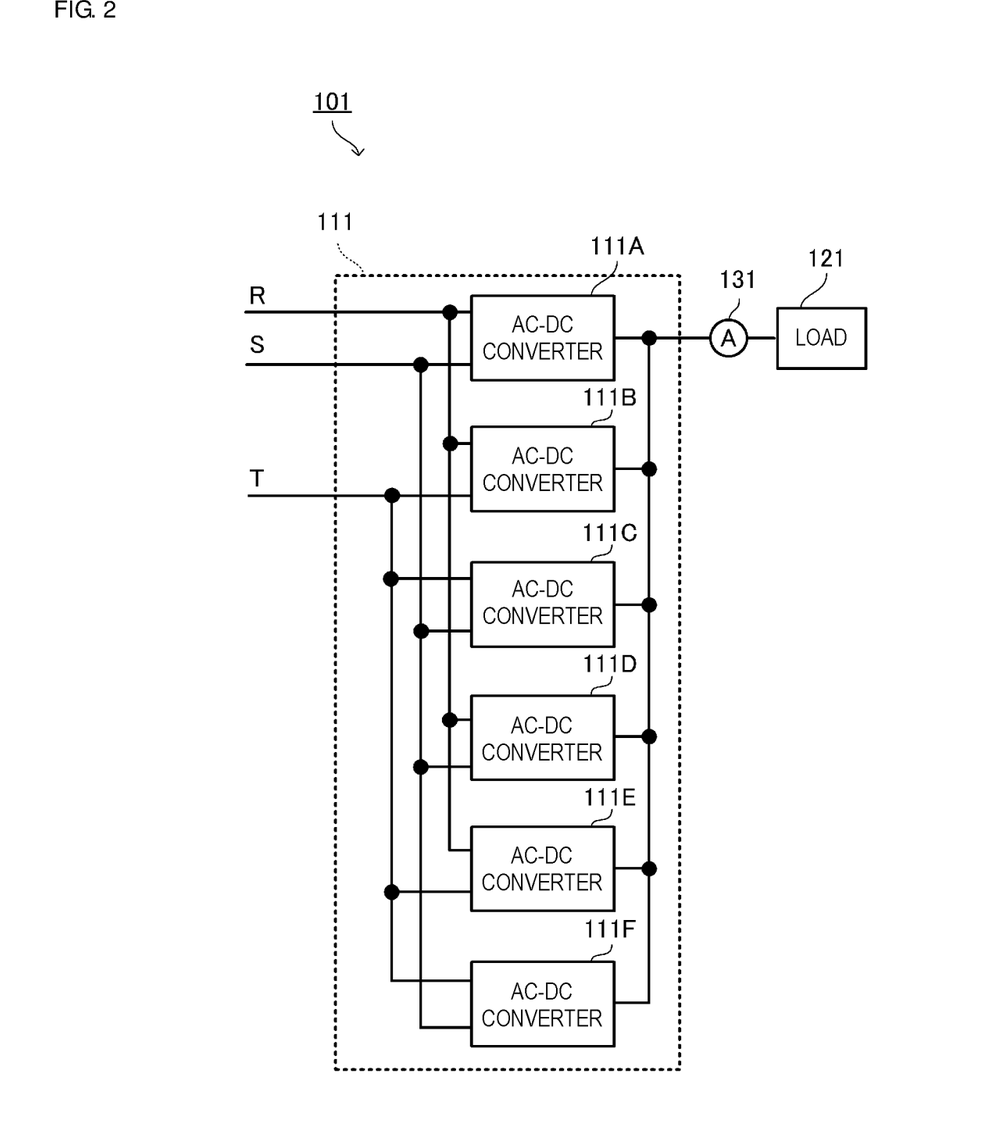
FIG. 2 is a block diagram illustrating the configuration of a converter.

FIG. 2 is a block diagram illustrating the configuration of the converter 111.

In the converter 111, AC-DC converters 111A, 111B, 111C, 111D, 111E, and 111F are connected in parallel to each other. The AC-DC converters 111A to 111F each convert voltage (for example, 200 V) between two phases, among the three phases of the three-phase alternating-current power supply 200, into the direct-current voltage (for example, 12 V) and each supply the direct-current voltage to the load 121. The R-phase line and the S-phase line are connected to inputs of the AC-DC converters 111A and 111D. The R-phase line and the T-phase line are connected to inputs of the AC-DC converters 111B and 111E. The S-phase line and the T-phase line are connected to inputs of the AC-DC converters 111C and 111F.

The AC-DC converters 111A and 111D are examples of a "first AC-DC converter". The AC-DC converters 111B and 111E are examples of a "second AC-DC converter". The AC-DC converters 111C and 111F are examples of a "third AC-DC converter".

Each of the AC-DC converters 111A to 111F compares its own output current with other output current to balance the output current (a current sharing function). In other words, the same current is output from the AC-DC converters 111A to 111F. This function enables the amount of output current (a load factor) per one AC-DC converter of the AC-DC converters 111A to 111F to be balanced to correct the deviation of the loads, thus ensuring the long lifetime of the converter 111.

The number of the server racks and the number of the AC-DC converters are not limited to the numbers illustrated in FIG. 1 and FIG. 2.

A process performed by the controller 100 will now be described. Although the process performed by the controller 100 for the server rack 101 will be described in the following description, the controller 100 performs the same or substantially the same process for the other server racks 102 and 103. The controller 100 is an example of a "determiner", a "selector", and a "controller".

The controller 100 calculates the load factor per one AC-DC converter of the AC-DC converters 111A to 111F from the detection results by the load current detector 131. If load power is decreased to cause the load factor to be lower than a threshold value, the controller 100 stops one or more of the AC-DC converters 111A to 111F. This enables the loss in the AC-DC converters to be reduced or prevented so as to improve power conversion efficiency. If the load power is increased to cause the load factor per one AC-DC converter of the AC-DC converters 111A to 111F to exceed the threshold value, the controller 100 drives the stopped AC-DC converter to decrease the load factor of each AC-DC converter and causes the AC-DC converter to operate in a high-efficiency area.

The controller 100 performs the same or substantially the same process for the other server racks 102 and 103. In this case, arbitrary two-phase lines, among the three phases of the three-phase alternating-current power supply 200, are connected to each AC-DC converter. Accordingly, stopping the multiple AC-DC converters in the power supply apparatus 1 at random makes the currents through the three-phase lines unbalanced. In other words, problems including a shift of the phase difference from about 120 degrees and/or a variation of the voltage may occur.

In the present preferred embodiment, the controller 100 stops and drives the AC-DC converter so that the currents through the three-phase lines are not unbalanced. A non-limiting example of a method of stopping and driving the AC-DC converter will be described below.

Figure 3:
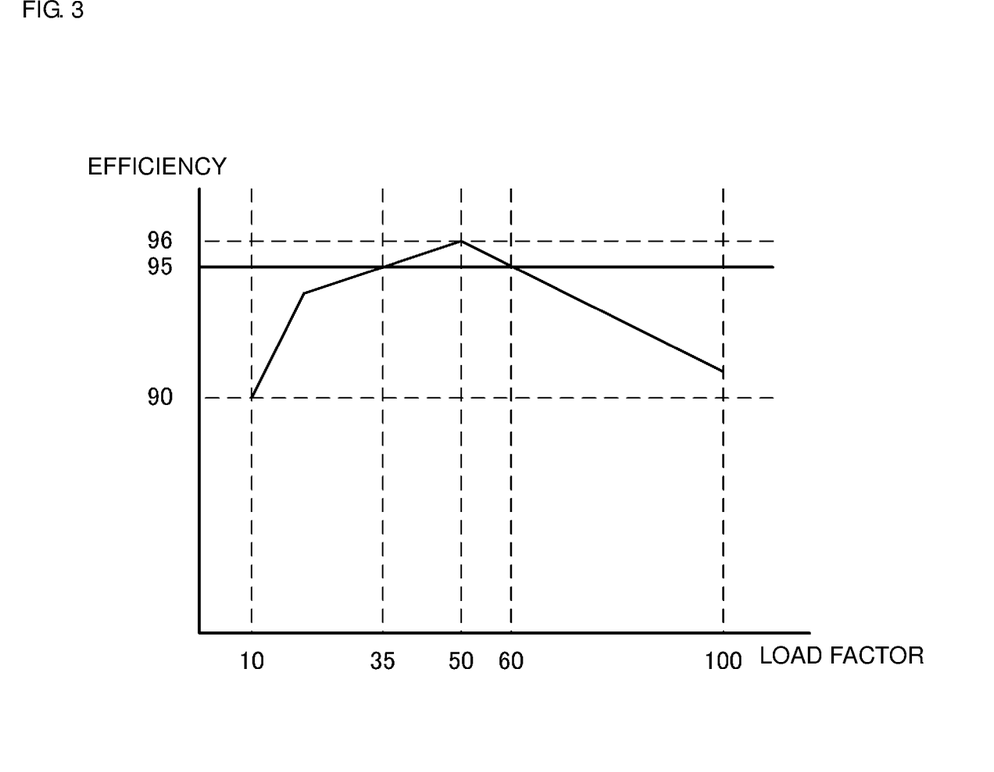
FIG. 3 is a diagram illustrating efficiency characteristics of AC-DC converters.

FIG. 3 is a diagram illustrating efficiency characteristics of the AC-DC converters 111A to 111F. Referring to FIG. 3, the vertical axis represents the power conversion efficiency and the horizontal axis represents the load factor of the AC-DC converter.

According to the above-described characteristics, the AC-DC converter preferably has, for example, the same or substantially the same power conversion efficiency at a load factor of about 35% and at a load factor of about 60% and exhibit high power conversion efficiencies within a range of the load factor from about 35% to about 60%. Accordingly, when the load factor of the AC-DC converter is outside the range from about 35% to about 60%, the controller 100 stops the AC-DC converter or drives the AC-DC converter that is stopped.

Specifically, the controller 100 switches the AC-DC converter in a driven state to a stopped state if the load factor is lower than about 35%. The controller 100 switches the AC-DC converter in the stopped state to the driven state if the load factor exceeds about 60%. About 35% is an example of a "first predetermined value" and about 60% is an example of a "second predetermined value".

Figure 4:
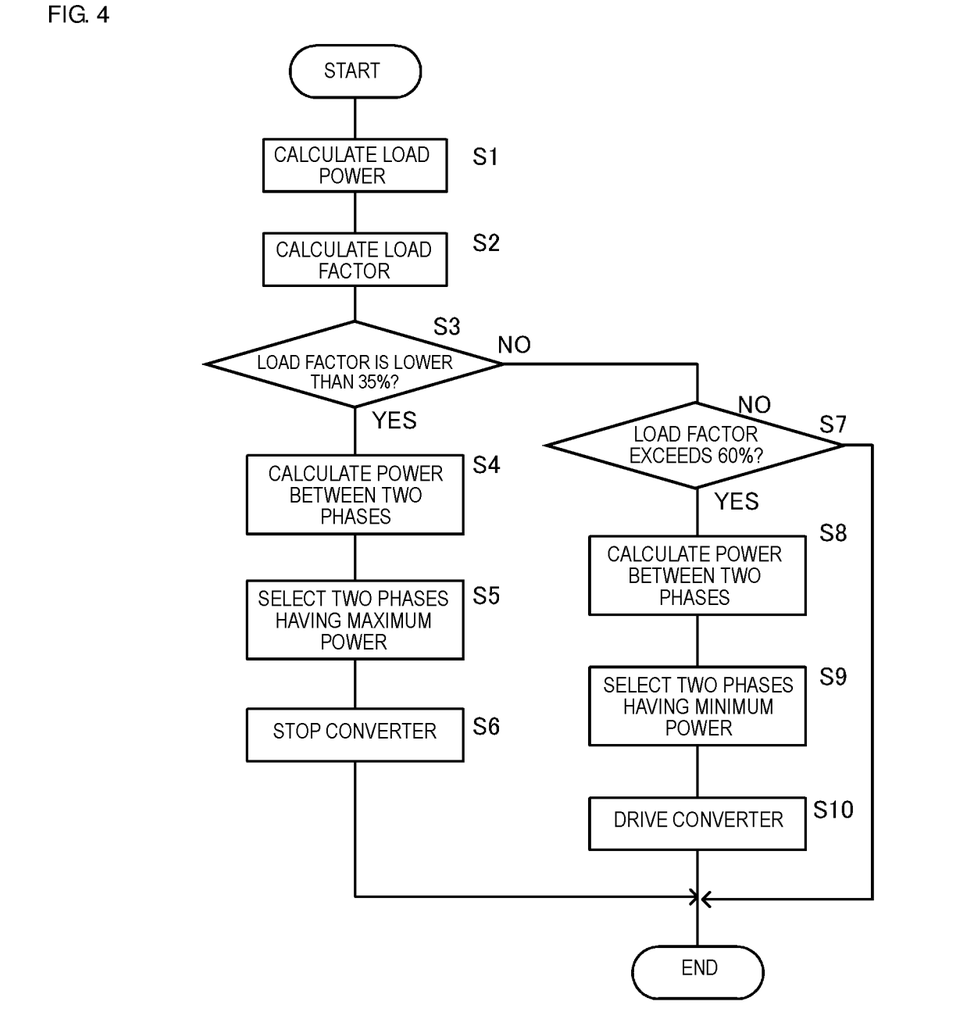
FIG. 4 is a flowchart of a driving-stopping process of the AC-DC converters.

FIG. 4 is a flowchart of a driving-stopping process of the AC-DC converters. The controller 100 performs the process illustrated in FIG. 4 for each of the server racks 101, 102, and 103. The driving-stopping process for the server rack 101 will be described below.

The controller 100 acquires the load current from the load current detector 131 to calculate the electric power of the load 121 (S1). The controller 100 calculates the load factor per one AC-DC converter of the AC-DC converters 111A to 111F that are driven from the calculation result (S2).

If the calculated load factor is lower than about 35% (YES in S3), the controller 100 acquires input current from the input current detectors 100A, 100B, and 100C to acquire the electric power between two phases, among the three phases of the three-phase alternating-current power supply 200 (S4). Specifically, the controller 100 calculates each of the R phase-S phase electric power, the R phase-T phase electric power, and the T phase-S phase electric power.

The controller 100 selects two phases having the maximum electric power from the calculation result (S5). The controller 100 stops the AC-DC converter connected to the selected two phases (S6). For example, when the R phase-S phase electric power is the maximum electric power, the controller 100 stops the AC-DC converter 111A (or the AC-DC converter 111D).

If no AC-DC converter is being driven in S6, the controller 100 may perform, for example, a process to drive or stop the AC-DC converter in the other server racks 102 and 103 to vary the electric power between two phases so that the current balance between the respective phases is kept.

If the load factor is not lower than about 35% in S3 (NO in S3), the controller 100 determines whether the load factor exceeds about 60% (S7). If the load factor exceeds about 60% (YES in S7), the controller 100 acquires the input current from the input current detectors 100A, 100B, and 100C to acquire the electric power between two phases, among the three phases of the three-phase alternating-current power supply 200 (S8).

The controller 100 selects two phases having the minimum electric power from the calculation result (S9). The controller 100 drives the AC-DC converter connected to the selected two phases (S10). For example, if the electric power between the R phase and the S phase is the minimum electric power and the AC-DC converter 111A (or the AC-DC converter 111D) connected between the R phase and the S phase is stopped, the controller 100 starts driving of the AC-DC converter 111A (or the AC-DC converter 111D).

If the load factor does not exceed about 60% in S7 (NO in S7), that is, if the load factor per one AC-DC converter of the AC-DC converters is within a range from about 35% to about 60%, the optimal power conversion efficiency is achieved. Accordingly, the controller 100 terminates this process without switching the AC-DC converter.

If no AC-DC converter that is stopped exists or the AC-DC converter fails in S10, the controller 100 may perform, for example, the process to drive or stop the AC-DC converter in the other server racks 102 and 103 to vary the electric power between two phases so that the current balance between the respective phases is kept.

In this process, the controller 100 switches between driving and stopping of the AC-DC converters one by one. In other words, the controller 100 minimizes the number of the AC-DC converters the state of which is switched between the stopped state and the driven state. As a result, it is possible to reduce or prevent the current unbalance between the three phases while reducing or minimizing the effect on the process that is being performed.

Figure 5:
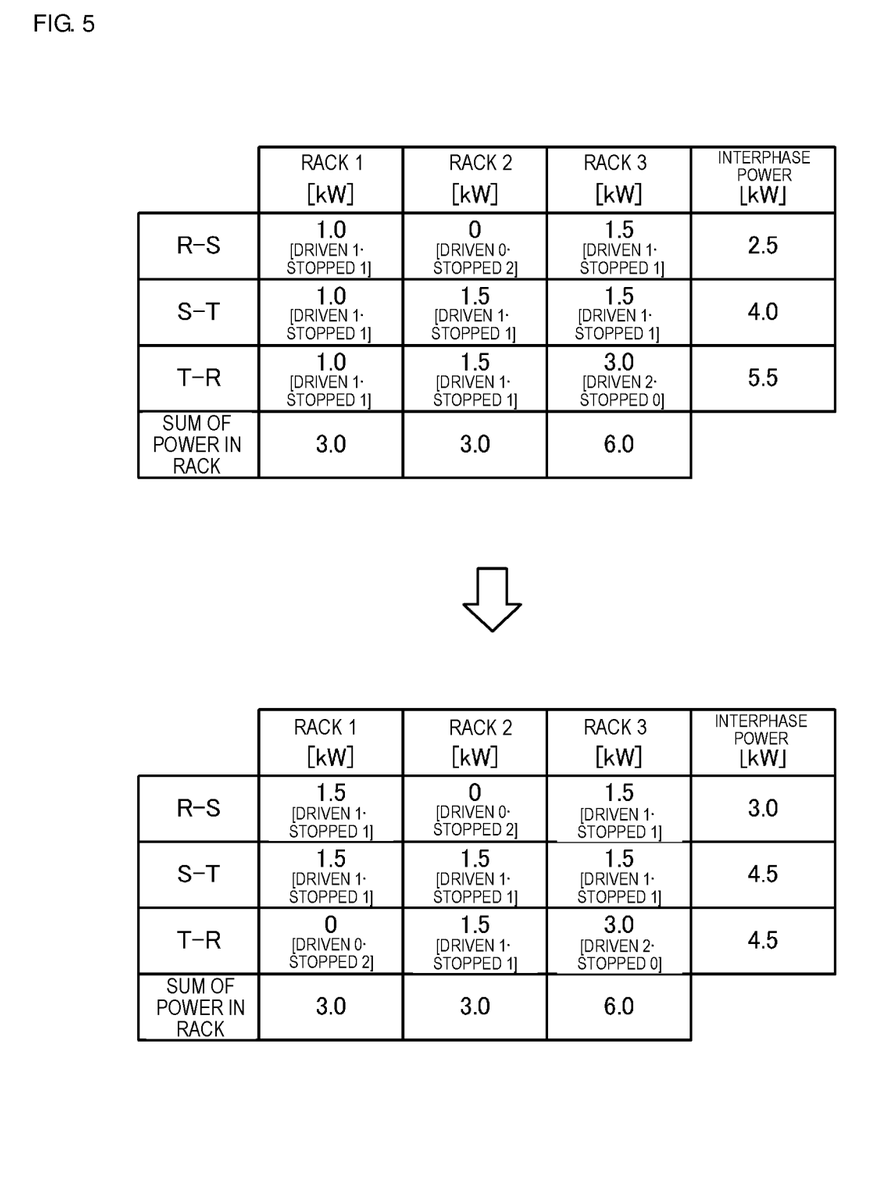
FIG. 5 illustrates the values of electric power between the respective phases before and after one AC-DC converter is stopped.

FIG. 5 illustrates the values of the electric power between the respective phases before and after one AC-DC converter is stopped.

An upper table in FIG. 5 illustrates the values of the electric power immediately before the AC-DC converter is stopped and a lower table in FIG. 5 illustrates the values of the electric power immediately after the AC-DC converter is stopped. Referring to FIG. 5, "RACK 1" indicates the server rack 101, "RACK 2" indicates the server rack 102, and "RACK 3" indicates the server rack 103.

"STOPPED 1" in the drawing indicates the number (one) of the AC-DC converters in the stopped state and "DRIVEN 1" in the drawing indicates the number (one) of the AC-DC converters in the driven state. For example, in the rack 1, the three AC-DC converters 111A, 111C, and 111B connected to the R phase-S phase, the S phase-T phase, and the T phase-R phase, respectively, are in the driven state, and the three the AC-DC converters 111D, 111F, and 111E connected to the R phase-S phase, the S phase-T phase, and the T phase-R phase, respectively, are in the stopped state. A case will now be described in which one AC-DC converter in the rack 1 is to be stopped.

It is assumed that the rated power per one AC-DC converter is about 3 kW, for example. Since the load factors of the respective AC-DC converters in the rack 1 are about 33% (=1 kW/3 kW), which are lower than the first predetermined value (about 35%), one AC-DC converter in the rack 1 is to be stopped. Immediately before the AC-DC converter is stopped, the electric power between the R phase and the S phase is about 2.5 kW, the electric power between the S phase and the T phase is about 4.0 kW, and the electric power between the T phase and the R phase is about 5.5 kW. In this case, the electric power between the T phase and the R phase is the maximum electric power. Accordingly, the controller 100 stops the AC-DC converter 111B connected between the T phase and the R phase. In other words, the two AC-DC converters 111A and 111C are in the driven state in the rack 1. The load factors of the AC-DC converters 111A and 111C are increased and, as a result, the electric power between the R phase and the S phase is about 3.0 kW and the electric power between the S phase and the T phase is about 4.5 kW. The electric power between the T phase and the R phase, the load factor of which is decreased, is about 4.5 kW. As described above, the electric power between the respective two phases after the AC-DC converter is stopped is near the balanced state, compared with that before the AC-DC converter is stopped.

Figure 6:
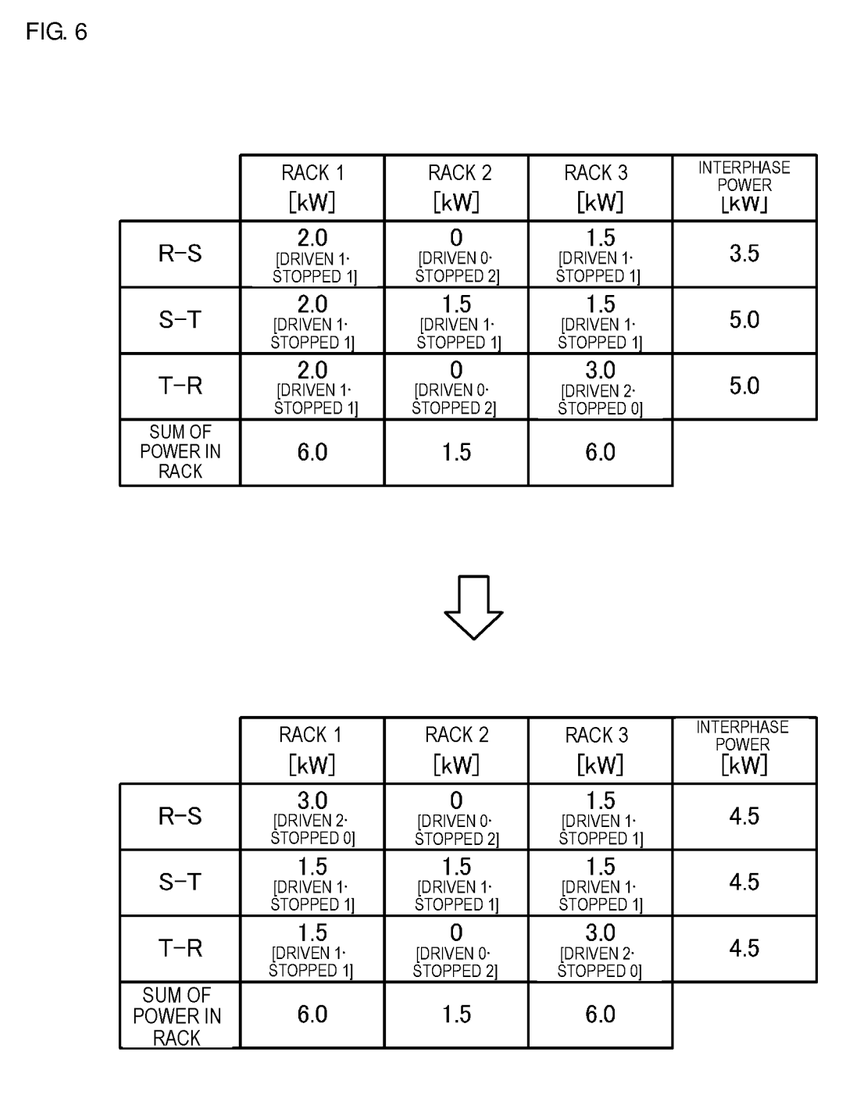
FIG. 6 illustrates the values of electric power between the respective phases before and after driving of the AC-DC converter in the stopped state is started.

FIG. 6 illustrates the values of the electric power between the respective phases before and after the driving of the AC-DC converter in the stopped state is started.

A case will now be described in which the AC-DC converter in the rack 1 is to be driven in this example. In the rack 1, the three AC-DC converters 111A, 111C, and 111B connected to the R phase-S phase, the S phase-T phase, and the T phase-R phase, respectively, are in the driven state, and the three the AC-DC converters 111D, 111F, and 111E connected to the R phase-S phase, the S phase-T phase, and the T phase-R phase, respectively, are in the stopped state.

Since the load factors of the AC-DC converters in the rack 1 are about 66% (=2 kW/3 kW), which are higher than the second predetermined value, one AC-DC converter in the rack 1 is to be driven. Immediately before the AC-DC converter is driven, the electric power between the R phase and the S phase is about 3.5 kW and the electric power between the S phase and the T phase and the electric power between the T phase and the R phase are about 5.0 kW. In this case, the electric power between the R phase and the S phase is the minimum electric power. Accordingly, the controller 100 drives the AC-DC converter 111D connected between the R phase and the S phase. In other words, the four AC-DC converters 111A, 111B, 111C, and 111D are in the driven state in the rack 1. As a result, the electric power between the R phase and the S phase, the electric power between the S phase and the T phase, and the electric power between the T phase and the R phase are about 4.5 kW. As described above, the electric power between the respective two phases after the AC-DC converter is driven is more balanced, compared with that before the AC-DC converter is driven.

As described above, switching between the driven state and the stopped state depending on the load factors of the AC-DC converters 111A to 111F in each of the server racks 101, 102, and 103 enables the current unbalance of the three-phase alternating-current input to be reduced or prevented.

The controller 100 may perform the switching of the AC-DC converter if the difference between the current values of any two phases, among the three phases of the three-phase alternating-current power supply 200, exceeds a threshold value. For example, if the difference (about 3.0 kW) between the electric power (about 2.5 kW) between the R phase and the S phase and the electric power (about 5.5 kW) between the T phase and the R phase exceeds a threshold value in FIG. 5, the controller 100 may determine that the current balance between the three phases in the three-phase alternating-current power supply 200 is not maintained and may perform the switching of the AC-DC converter to reduce or prevent the unbalance.

If multiple target AC-DC converters exist when the AC-DC converter is to be stopped, the controller 100 may sequentially stop the AC-DC converters in the descending order of their cumulative operating times. Stopping the AC-DC converters in the descending order of their cumulative operating times enables the failure rate of the AC-DC converters to be reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A power supply apparatus comprising:
   a plurality of converters connected in parallel to a three-phase alternating-current power supply to convert alternating-current power from the three-phase alternating- current power supply into direct-current power to supply the direct-current power to different loads;

a phase current detector to detect current flowing through a first phase line, a second phase line, and a third phase line of the three-phase alternating-current power supply; and a load current detector to detect load current of the plurality of converters; wherein each of the plurality of converters includes a first AC-DC converter an input of which is electrically connected to the first phase line and the second phase line, a second AC-DC converter an input of which is electrically connected to the first phase line and the third phase line, and a third AC-DC converter an input of which is electrically connected to the second phase line and the third phase line;

the first AC-DC converter, the second AC-DC converter, and the third AC-DC converter are connected in parallel to each other by a common output;

each of the first, second, and third AC-DC converters that is driven maintains balance of an output current, the power supply apparatus further comprising:

a determiner that determines whether switching between a driven state and a stopped state of the first AC-DC converter, the second AC-DC converter, and the third AC-DC converter is performed based on a detection result from the load current detector, while maintaining the output current of each of the first, second, and third AC-DC converters to be substantially the same;

a selector that, if the determiner determines that the switching is performed, selects targets to be driven and to be stopped from the first AC-DC converter, the second AC-DC converter, and the third AC-DC converter based on a detection result by the phase current detector; and a controller that switches between the driven state and the stopped state of the first AC-DC converter, the second AC-DC converter, and the third AC-DC converter based on a selection result by the selector;

each of the first, second, and third AC-DC converters is configured to perform a current sharing function; and the determiner maintains the output current of each of the first, second, and third AC-DC converters to be substantially the same based on the current sharing function.

2. The power supply apparatus according to claim 1, wherein, if the determiner determines that the AC-DC converter in the driven state is to be switched to the stopped state, the selector selects the AC-DC converter connected to two phases having a largest difference in a current value, which is detected by the phase current detector, as the target to be stopped.

3. The power supply apparatus according to claim 1, wherein, if the determiner determines that an AC-DC converter among the first, second, and third AC-DC converters in the stopped state is to be switched to the driven state, the selector selects the AC-DC converter connected to two phases having a smallest difference in a current value, which is detected by the phase current detector, as the target to be driven.

4. The power supply apparatus according to claim 1, wherein the determiner performs the switching determination based on whether any two phases, among the three phases of the three-phase alternating-current power supply, have a difference in a current value exceeding a threshold value.

5. The power supply apparatus according to claim 1, wherein the determiner determines that an AC-DC converter among the first, second, and third AC-DC converters in the driven state is switched to the stopped state if a load factor of at least one of the first AC-DC converter, the second AC-DC converter, and the third AC-DC converter, which is detected based on the detection result from the load current detector, is lower than a first predetermined value, and determines that the AC-DC converter in the stopped state is switched to the driven state if the load factor exceeds a second predetermined value.

6. The power supply apparatus according to claim 1, wherein the selector selects the targets so that a minimum number of the first, second, and third AC-DC converters are to be switched.

7. The power supply apparatus according to claim 1, wherein the selector selects the AC-DC converter among the first, second, and third AC-DC converters having a longest cumulative operating time.

8. The power supply apparatus according to claim 1, wherein the first phase line is an R-phase line, the second phase line is an S-phase line, and the third phase line in a T-phase line.

9. The power supply apparatus according to claim 1, wherein the controller includes a microcomputer.

10. The power supply apparatus according to claim 5, wherein the first predetermined value of the load factor is about 60%, and the second predetermined value of the load factor is about 35%.

* * * * *